United States Patent
Benson et al.

[11] Patent Number: 5,816,138
[45] Date of Patent: Oct. 6, 1998

[54] APPARATUS FOR PREPARING A BAKED, NON-OIL CONTAINING SNACK FOOD PRODUCT

[75] Inventors: Clark K. Benson, Millbrae; Andrew A. Caridis, San Carlos; Donald B. Giles, Castro Valley; Daniel E. Brown, San Mateo; James A. Padilla, Pacifica; Thomas F. Leary, Sebastopol; Leonardo P. Murgel, San Francisco, all of Calif.

[73] Assignee: Heat and Control, Inc., Hayward, Calif.

[21] Appl. No.: 756,271

[22] Filed: Nov. 25, 1996

Related U.S. Application Data

[62] Division of Ser. No. 475,485, Jun. 7, 1995, Pat. No. 5,603,973.

[51] Int. Cl.⁶ ................................................. A47J 37/00
[52] U.S. Cl. ............................ 99/355; 99/386; 99/443 C; 99/451
[58] Field of Search .................. 426/241, 242, 426/243, 637; 99/443 C, 451, 386, 391, 355

[56] References Cited

U.S. PATENT DOCUMENTS

| | | |
|---|---|---|
| 3,519,432 | 7/1970 | Succo et al. |
| 4,073,952 | 2/1978 | Standing et al. ........................ 426/242 |
| 4,749,579 | 6/1988 | Haydock et al. ........................ 426/242 |
| 4,756,916 | 7/1988 | Dreher et al. ............................ 426/302 |
| 4,800,090 | 1/1989 | August ..................................... 426/243 |
| 4,834,996 | 5/1989 | Fazzolare et al. ....................... 426/302 |
| 4,873,093 | 10/1989 | Fazzolare et al. ........................ 426/28 |
| 4,906,483 | 3/1990 | Kloos ....................................... 426/243 |
| 4,919,965 | 4/1990 | Childers, Jr. ............................ 426/615 |
| 5,049,711 | 9/1991 | August ................................ 426/241 X |
| 5,104,673 | 4/1992 | Fazzolare et al. ....................... 426/549 |
| 5,110,613 | 5/1992 | Brown et al. ............................ 426/549 |
| 5,180,601 | 1/1993 | Gaon et al. .............................. 426/242 |
| 5,194,277 | 3/1993 | Laufer ..................................... 426/243 |
| 5,202,139 | 4/1993 | Gaon et al. .............................. 426/242 |
| 5,292,540 | 3/1994 | Laufer ..................................... 426/242 |
| 5,298,707 | 3/1994 | Sprecher et al. ........................ 219/693 |
| 5,320,858 | 6/1994 | Fazzolare et al. ....................... 426/549 |
| 5,470,600 | 11/1995 | Petelle et al. ....................... 426/637 X |

FOREIGN PATENT DOCUMENTS

| 34 43218 | 5/1986 | Germany ................................ 426/242 |

*Primary Examiner*—Arthur L. Corbin
*Attorney, Agent, or Firm*—Flehr Hohbach Test Albritton & Herbert, LLP

[57] ABSTRACT

A process and apparatus for preparing a snack food product by baking and without the use of cooking oil, begins with preparation of potatoes, carrots, bananas, etc, into slices, which are surface de-watered before exposure to a high intensity heat source including infra red or open flame at about 1400 F. to blanch the slices and halt enzyme action before exposing the slices to hot, dry air impingement until the slices are reduced in moisture to about 10 to 35%, while the slices are maintained in a mono layer. Then the slices are aggregated into a pack and dried in hot dry air until the moisture content of the slices has been reduced to about 0.5 to 2%.

The apparatus includes an insulated housing with a product conveyor belt extending therethrough. A combination of overhead infra-red burners and underneath open flame burners are positioned to create a high energy heat zone along one length of the belt. Air impingement scatter slots are positioned above and below a subsequent length of the belt, and a superimposed hold down belt restrains the products from scattering. A dryer zone with moving hot dry air is provided to reduce the product moisture to a desired final end point.

3 Claims, 8 Drawing Sheets

APPARATUS FOR PREPARING A BAKED, NON-OIL CONTAINING SNACK FOOD PRODUCT

This is a division, of application Ser. No. 08/475,485 filed Jun. 7, 1995, now U.S. Pat. No. 5,603,973.

FIELD OF THE INVENTION

The present invention relates to the preparation of snack food products. More particularly, the present invention relates to a process for the preparation of chip products including those made from starting materials such as potatoes, carrots, bananas, plantains, sweet potatoes, taro root and sheeted products such as tortilla chips, all without the use of any form of cooking oil.

BACKGROUND OF THE INVENTION

The popularity of snack food products such as potato chips is well known and had become a significant contributor to the calories and fats consumed in a day by the consuming public. The manufacturers of snack food products have become very much aware of this dietary concern by the consuming public and have responded by introducing low fat potato chips having a fat content from 0% to 27%. The processes employed include using a microwave oven in combination with conventional radiant heat forced air type of oven, as well as infrared energy. The most comprehensive teachings in the field of the present invention can be found in U.S. Pat. No. 4,800,090 to August. The patent teaches the preparation of a potato chip without the use of oil, using first an infrared heating source to warm the exterior of the sliced potato pieces, then a microwave energy source to warm the interior of the potato pieces and finally a second infrared heating source to achieve browning of the potato pieces. The infrared energy is supplied evidently at a relatively low intensity in that the exposure time for precooking can be as long as 5 minutes. This is followed by microwave treatment for as long as 5 minutes with a preferable range at one to two minutes. The final infrared browning stage is in the preferable range of about one minute although the range may be as long as 5 minutes. The overall cook time in the August '090 patent is quite long. The electrical energy consumption in the microwave cooking step is high and the energy consumption in the infrared stages should ideally be reduced. The desired layering or blistering of the potato product is not seen as easily obtained in the teachings of the August '090 patent as is desired in the marketplace by consumers.

The usual method of preparing potato chips involves the slicing of raw potatoes, the insertion of these slices into a reservoir of hot oil for a predetermined period of time so that the slices are fried to a crisp state, followed by the removal of the fried chips from the oil. The effect of frying of the potato slices is to reduce the water content of the slices while allowing the undesirable oil uptake. The oil uptake however results in the appropriate surface color while the reduction of the water content causes the desired crispness. Fresh potatoes contain approximately 80% moisture. The finished potato chip product contains less than 2% moisture. The oil fried chips contain from 30–40% oil or fat of the total weight of the potato chip.

SUMMARY OF THE INVENTION AND OBJECTS

In summary, one aspect of the invention concerns a process, analogous to baking, for making crisp, well-colored potato chips from whole potatoes without the use of oil, wherein whole potatoes are cut into discrete slice pieces which are washed so as to remove starch or debris from the slice surfaces. The slices are arranged in a single layer and the surface water is removed from the slice surfaces by exposing them to blasts of air and suction. Alternatively, the slices may be washed in warm water at a temperature of about 130° F. so as to preheat them. The slices are transferred to a heated conveyor to enter the infrared zone for exposure to high intensity infrared energy for a short period of time, less than 25 seconds, effecting a blanching of the slices and quenching of enzyme action. In a subsequent step, dry air is impinged upon the slices from above and below to reduce the water content below 35% by weight. The slices are accumulated in a multi-layer pack and dried in moving air until moisture content has been obtained to a level on the order of 0.5% to 2%.

Another aspect of the invention resides in an apparatus for continuously preparing potato chips without the use of cooking oil and having means for slicing whole potatoes, potato slice washing means receive the potato slices and first conveyor means serve to remove the slices from the washing water where the starch particles and the like are removed from the slices, slice spreading means, and surface water reduction means. An oven housing with inlet and outlet openings and second conveyor means extending through said housing for carrying the slices therethrough for cooking treatment. Infrared burner means are arranged in the housing above the conveyor therein and serves to transmit infrared energy in the temperature range of about 1200° F. to 1600° F. onto the potato slices carried by the pre-heated conveyor. Open flame burner means are arranged in the housing below the conveyor and project a flame onto the potato slices and serve to blanche said slices and quench substantially the enzymes therein. First and second arrays of air impingement, slot-like openings arranged above and below the conveyor means direct a first process vapor onto the slices carried by the conveyor. Means collect the slices into a multi-layer pack and dryer means supply a second process vapor to the layered pack, the dryer means being equipped to reheat and recirculate the second process vapor following contact with the potato slice pack.

A general object of the invention is to provide without the use of oil an improved process and apparatus for preparing in a continuous manner crisp, palatable potato chips from whole potatoes.

Another object of the invention is to provide oil-free potato chips which possess the characteristic "bite" and color associated with commercially available potato chips.

Yet another object of the invention is to provide a process in which the potato slices are quickly blanched so as to halt decolorizing enzyme action, the blanching being achieved by exposure for a short period of time to high temperature infrared energy.

Still another object of the invention is to provide in a process for preparing oil-free potato slices a step for rapidly removing water from the slices with hot air impingement.

Yet another object of the invention is to provide in a production process for the drying of a multi4ayer pack or stack of potato slices so as to achieve a final moisture content of between 0.5% and 2% by weight.

Still another object of the invention is to provide for a continuous process for producing oil-free potato chips which possess the random blistering found in commercial grade chips and which are substantially free of charring or edge burning.

Yet another object of the invention is to provide an apparatus for carrying out the foregoing process.

Other objects and features of the invention will become apparent from the following detailed description of the means and manner of its deployment taken in connection with the accompanying drawings.

DESCRIPTION OF THE PREFERRED EMBODIMENTS

A baked snack food product such as a potato chip of the character contemplated by the present invention can be prepared from conditioned potato varieties which are suitable for the preparation of potato chips and which provide the desired potato chip taste and color. While the Norchip variety is preferred, Kennebec and Winona potatoes are among other varieties which can be employed in the present Invention to provide potato chips with a good flavor, but without the use of cooking oil.

Figure 1:
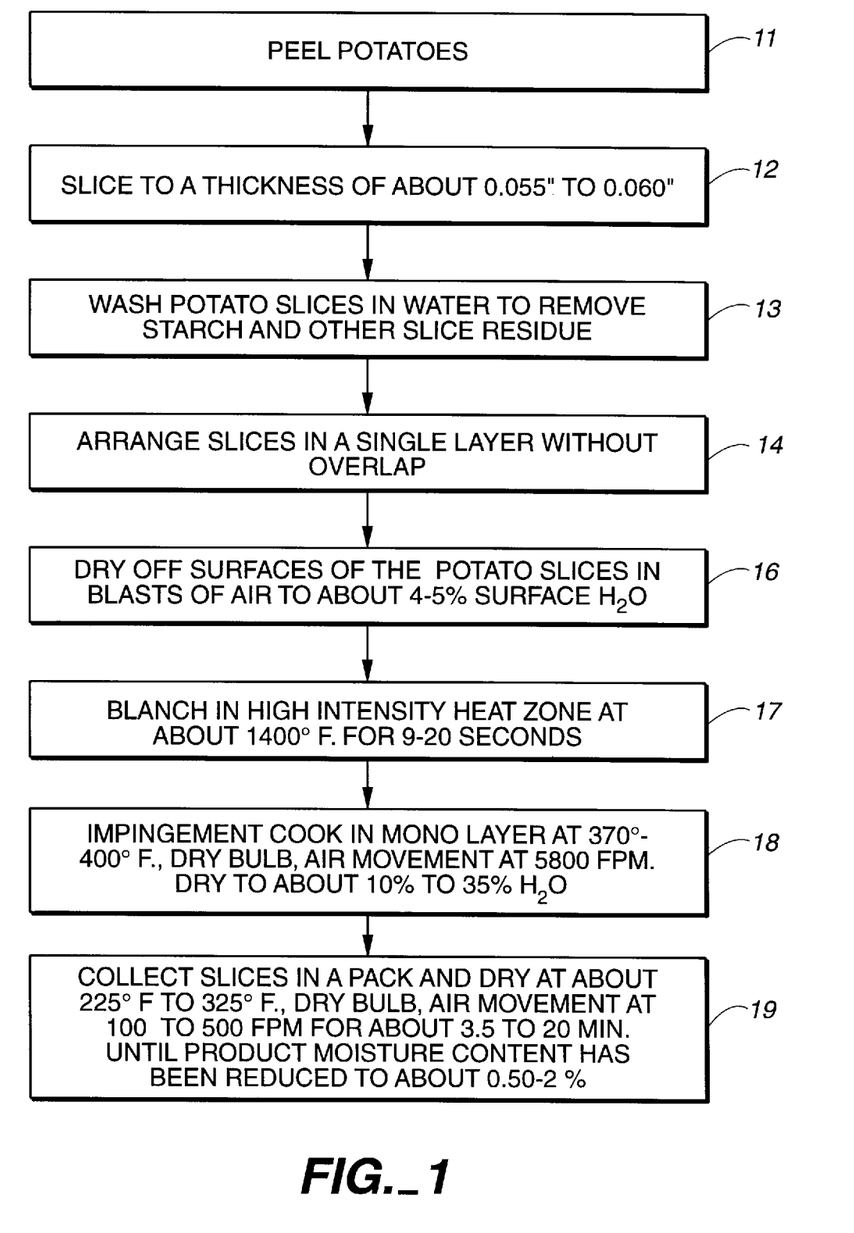
FIG. 1 is a diagrammatic flow chart illustrating the process for preparing a non-oil snack food product such as a potato chip.

Referring to the flow chart of FIG. 1 of the drawings, an important preparatory step 11, is the peeling of the potatoes, although in some potato chip applications, the peel is left on the potato for a particular taste preference. Prior to peeling, potatoes are thoroughly washed to remove sand and dust. There has been a practice of using high temperature lye peeling which was found more effective in removing blemished areas of the potato than is low temperature peeling. Abrasive peeling, although resulting in higher weight loss than lye or steam peeling, is nevertheless an efficient procedure for removing the potato peel with a minimum of handling and in a short amount of time. Peelers adapted for use in the process of this invention are the Hawkeye Peeler, Model No. 2210, available from the Hawkeye Division of Heat and Control, Inc., Hwy 164 West, R.R. 2, Box 124, Galesburg, Ill. 61401. The peeled potato may be trimmed, inspected and sorted or sized prior to slicing.

The slicing step 12 may be performed in equipment, including the Urschel Model CC slicer, 2503 Calumet Avenue, P.O. Box 2200, Valparaiso, Ind. 46384-2200, with the slicing machine set preferably to produce potato slices to a thickness of about 0.055" to about 0.060". The potato slicing operation causes starch to be released from the severed potato cells and other cellular material may be found upon the surface of the slices. It has been found highly desirable to remove these potato constituents prior to introduction of the slices into the high temperature stages of the subject process because it has been learned that should the residual starches, potato pieces, and other cellular products remain, the result is a potato chip which is "off color".

A washing step 13 is provided with equipment disposed to receive the potato slices in a bath of water so that the starches and other slice residue may be washed away from the slice surfaces. The potato washing water may be at ambient temperature or to reduce the heat load In subsequent processing steps, the wash water may be heated so as to bring the potato slice temperature to about 130° F. The potato slices are removed from the water bath by out-take conveyor and means are provided to disperse the potato slices on the conveyor in substantially a single layer as indicated in step 16 for further conduct through the successive stages of the process.

Surface water and other residue is removed from the slices by the action of fast moving air engaging the potato slices, setting them into motion while a negative pressure or suction is created below the slices carried by the outtake conveyor belt to the end that the slices entering the infrared zone have surface water on the order of from 4 or 5% to about 10% moisture by weight as indicated in step 16. Apparatus which carries forward this function in an excellent manner is found in U.S. Pat. No. 4,251,895, entitled Surface Water Removal From Potato Slices, granted Feb. 24, 1981 to Heat and Control, Inc., the Assignee of the present application. Another mode of surface water removal is the blotting of the slices against a highly absorbing media such as, for example, paper toweling.

Surface water removal may be effected either before or after distributing the slices in a single layer without overlap, step 14. The consequences of an overlap would be the shadow effect of one slice upon the other resulting in two chips or slices which are not completely cooked and which have different color characteristics or their surfaces. Another consequence of overlap slices is that the slices tend to weld into a clump which is an undesirable condition leading to a rejected product for not meeting specifications. For this reason, the arrangement of slices in a single layer without overlap contributes to the overall success of the subject process to a significant extent.

Blanching the potato slices in a field of high intensity infrared energy for a short period of time, step 17, serves to substantially diminish enzyme activity and thereby permit the slices at the end of the process to possess the natural golden color associated with potato chips. More particularly, the enzyme, polyphenoloxidase (monophenol, dyhydroxyphenylalanine; oxygen oxidoreductase; EC 1.14.18.1; 1,2-benzenediol; oxygen oxidoreductase, EC 1.10.3.1) is found in high concentration in potato tubers and is of particular importance because of the brown, red and blue discoloration resulting from the action of this enzyme. Not only is there an undesirable color formation, but browning results and loss of nutrient quality and undesirable taste if this enzyme is left unchecked. This and other enzymes present in this potato slice are inactivated by heating to internal temperatures in the range of from 140 to 190° F.

This blanching of the potato slice is can be achieved in one application of the invention through the use of an almost furnace-like atmosphere where the temperature is on the order of 1400° F. This intensely high heat zone is created by infra-red burners including open flame or open flame entirely to which the upper surface of the slice is exposed while the bottom surface of the slice is exposed to open flame from a gas ribbon burner. This contact of the slice with the high heat energy sources is for a period between 10 and 20 seconds during which the slices become translucent and the surfaces tend to "seal" which in subsequent steps encourages blistering, a desirable characteristic of potato chips. Depending upon the moisture permitted to remain on the slice surfaces in the water removal step 16, with the slices held in the intense heat infrared zone for an interval much longer than 17 seconds, edge burning, discoloration and crisping result. Were the chips maintained in the infrared zone for a period much less than 12 seconds, the enzyme activity would remain unquenched and the surface sealing incomplete. Discoloration in the final product occurs with greater frequency for unduly short treatment times, those less than 9 seconds. Inactivation of the indigenous enzymes is one highly desired effect of the initial high temperature heat treatment of the potato slices. Furthermore, during this step the potato slices have lost considerable moisture and are then at approximately 75% moisture content.

Immediately following the slice blanching with high energy, intense radiant heat, the slices are cooked in rapidly moving streams of hot air issuing from rows of multiple impingement jets arranged above and below the conveyor belt. The impingement of the air upon the slices may be at the velocity of 3,000 to 8,000 feet per minute, 4,000 fpm being one satisfactory rate at a temperature from 300°–450° F. The slices are maintained confined against airborne movement in the dry air impingement stage, step 18, for a period of time ranging from 30 to 90 seconds. A substantial amount of moisture is removed from the slices by the fast-moving hot, dry air and at the end of this step the slices have approximately 10 to 35% moisture content, ideally, 25% to 35%. Because of the high velocity of the moving impinged air, the slices tend to scatter during this second stage of moisture removal and to ensure that the slices are maintained in a mono layer, an upper conveyor belt of woven wire construction moves at a distance of about 0.25 to 0.5 inches above the carrying conveyor belt to serve as a containment belt or member. The arrangement of the conveyors will be explained in more detail below.

During the high intensity hot air impingement on the slices, a major portion of the moisture within the potato slice is heated into vapor within a short period of time. Where the slices entered or began the impingement cook step 18, having about 65% to 75% moisture content, they leave this step having but 10% to 35% moisture content, ideally, 25% to 35%. Given that water vapor and steam occupy a substantially greater volume than the same quantity of water in liquid form, the rapid conversion into steam of the water within the potato slice has the effect of causing portions of the slice to puff up or blister.

We have found a correlation between desired sizes of individual blister areas and temperature of treatment in the impingement zone. Blister areas in the range of 0.2 square inches, which is a desired good range, were formed when the impingement air temperature was in the range of about 400° F. with the air speed at 4,000 FPM around the product slices. The blister formation contained many small blisters resembling those commonly found on a soda cracker. At lower temperatures on the order of 315° F., the chips developed large, pillow like blisters resembling a delamination. This formation was along the chip edge portion while the central chip portion was pasty and paper-like. Thus we find ample justification for processing at temperatures around 400° F. to establish good blister formation over the slice surfaces.

During the impingement treatment, steam also quickly escapes from the slice and has the effect of increasing the roughness and surface porosity of the slice. The increased surface porosity facilitates further dehydration of the potato slice and also provides a desirably roughened or texturized outer surface traditional with the deep-fried potato chips.

We understand that the rapid conversion of a substantial portion of moisture in the potato slice into steam and its rapid removal of the steam from the slice prevents gelatinization as well as the formation and hardening of a starch layer on the exterior surface of the slice. The Intensity of the hot dry air to which the slices are exposed can be varied along with the duration of time within this field, serving to achieve at least one desired effect of preventing gelatinization which would cause sticking together of the slices forming clumps in a subsequent step. This was found where the slices were removed from the impingement step while containing about 40 to 45% moisture with the result or severe clumping or clustering together of the slices in the subsequent drying step as indicated by the broken line curve of FIG. 2. On the other hand, we have had good results when continuing the impingement cooking until the moisture content is lowered to about 30 to 35% and have had acceptable results although a dark final color when impingement was continued until the slices reached about 8 to 10% moisture.

We recognize that by rapidly converting water within the slice into steam that swiftly escapes, this moisture is re-circulated in the hot moving vapor. Throughout this step, the slices are maintained in a mono layer which ensures the effectiveness of the rapid drying of the slice to a water content wherein the slices do not tend to cling together.

Selected seasonings may be applied to the slices at this stage of the process.

Figure 4:
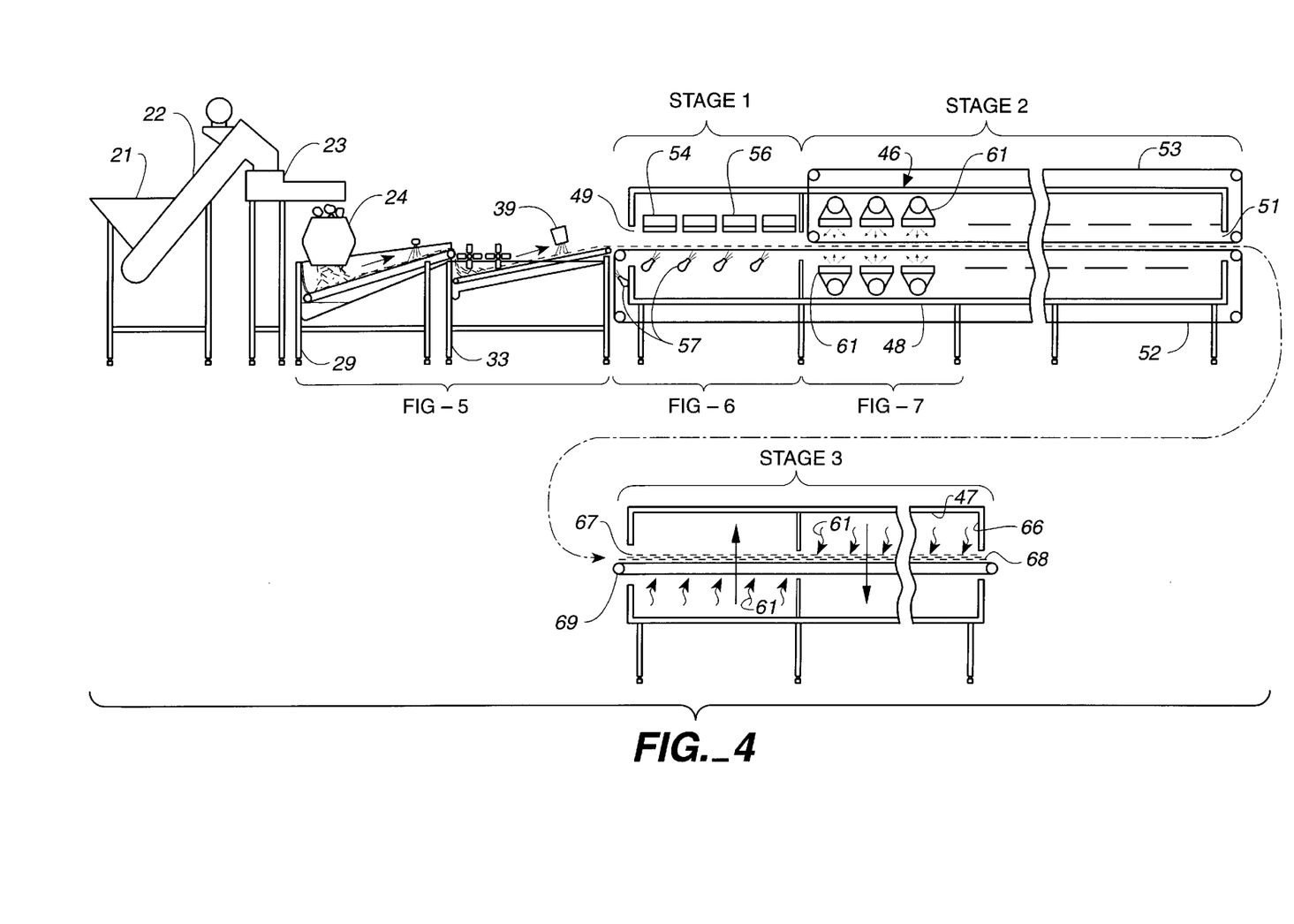
FIG. 4 is an elevation view of the equipment shown in FIG. 3.

After exposure to impingement cooking, potato slices are collected into a pack on a conveyor belt and are further dried, step 19 in FIG. 1. More particularly, the potato slices then having been reduced to about 25 to 35% moisture are transferred to the third cooking or finishing stage 19 and as they are entering this stage, the slices are collected into a pack of about 2 to 4 inches in depth and are carried on a product conveyor of open mesh design or on a belt of woven wire design. The slices are conveyed in a multiple layer pack to gain the maximum loading on the belt per square foot of area. Heated air is circulated through the pack acting vertically acting alternately upwardly and then, as indicated in FIG. 4, downwardly at a velocity of about 100 to 500 feet per minute and at a temperature of 225°–325° F., dry bulb. The slices remain in the drying zone for a period of time on the order 5 to 20 minutes at which time they are reduced to a moisture content of 0.5 to 2% moisture which is similar to that of the traditional deep oil-fried potato chip.

The resulting cooked slices have the taste and texture, color and bite associated with the traditional potato chips. After step 19, the third cooking stage, the chips may be forwarded to seasoning and packaging.

Figure 2:
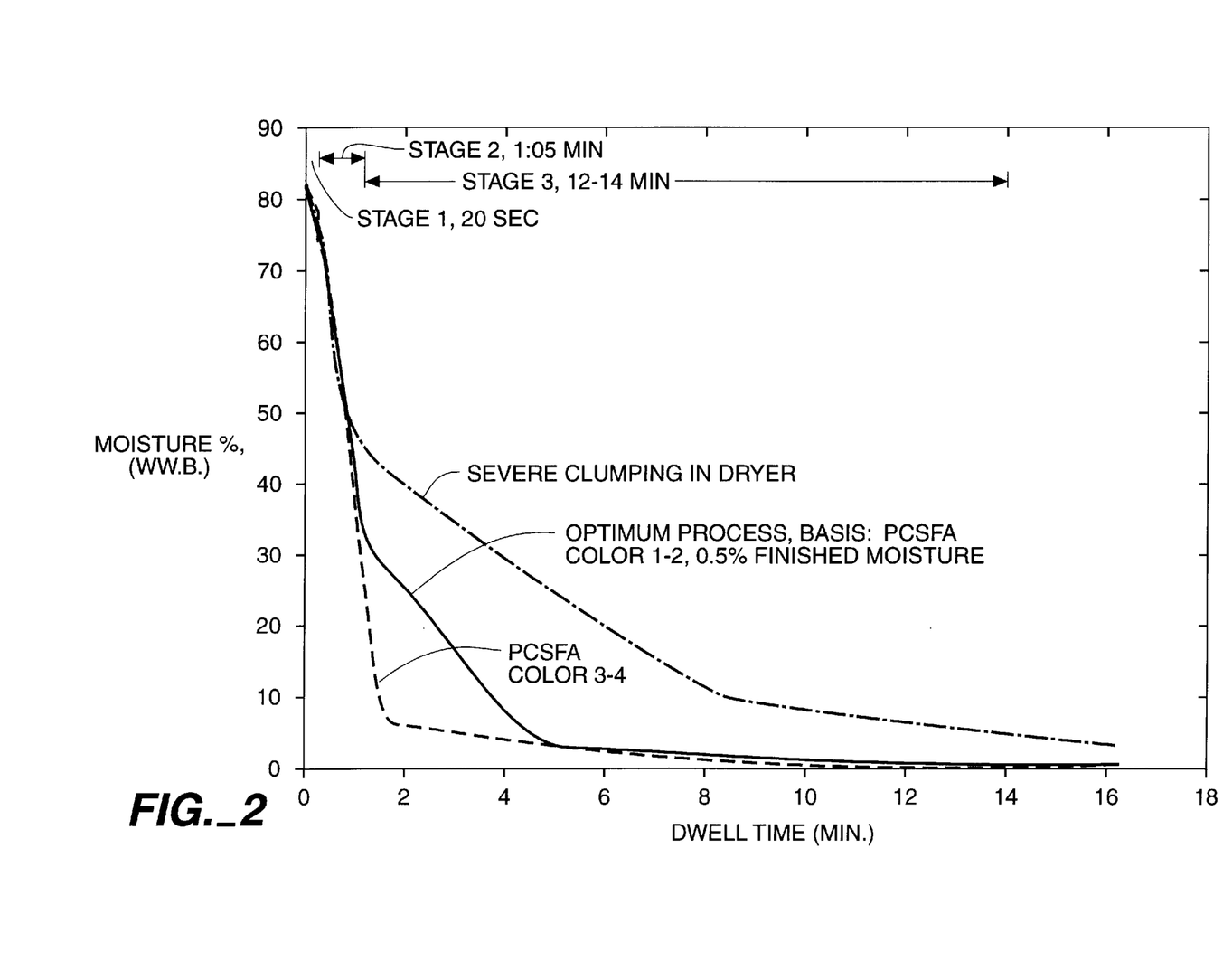
FIG. 2 is a time and potato weight percent moisture curve of three stages of the process of the present invention, the vertical ordinate signifying wet-weight-basis (W.W.B)
Figure 3:
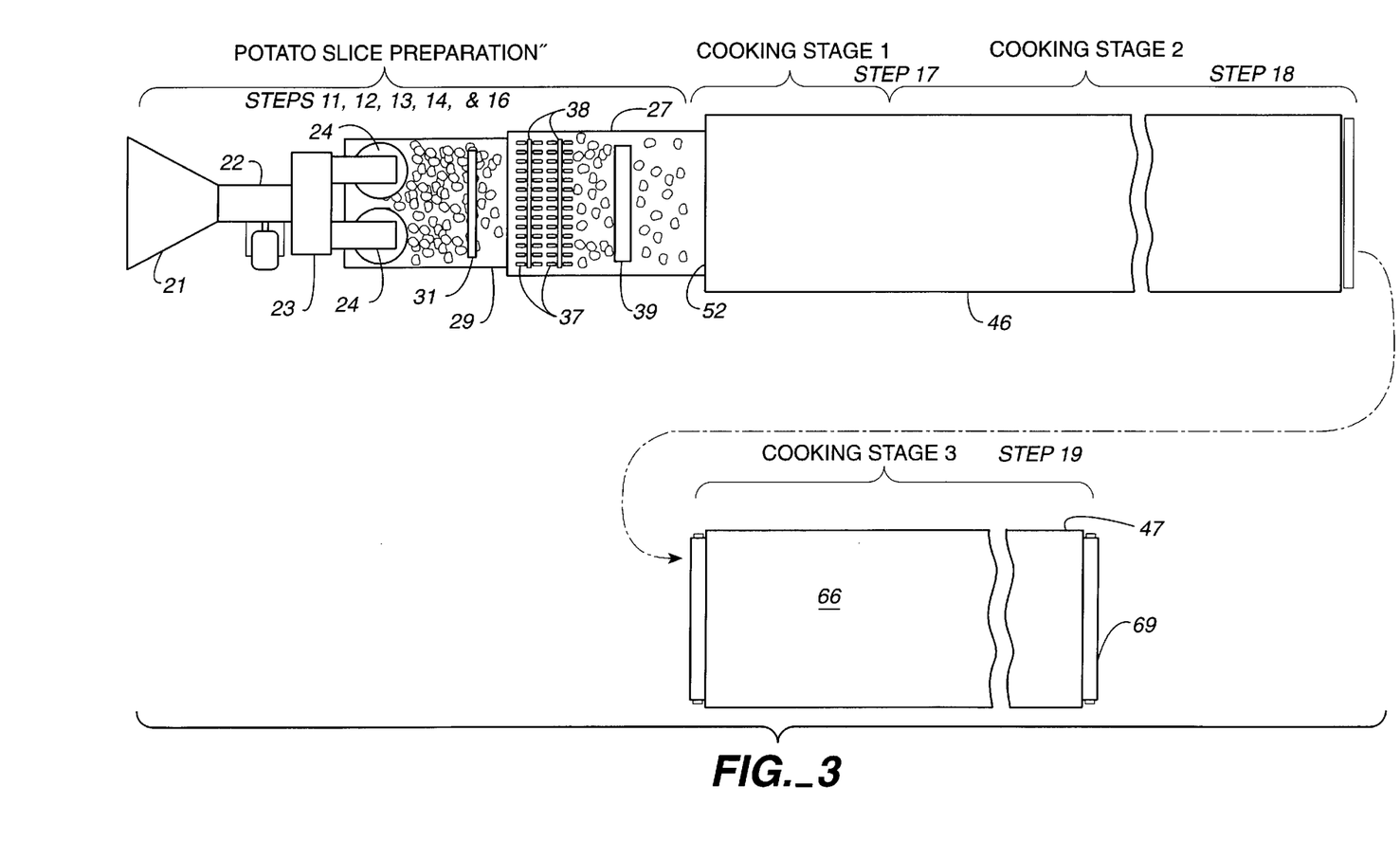
FIG. 3 is a plan diagrammatic view of the equipment adapted for the continuous process of the present invention.

Referring particularly to FIGS. 2 and 3, equipment with which the process as described above may be carried out is shown there. This equipment provides for three distinct stages of the process. More specifically, the equipment grouped in the potato slice preparation operation includes a hopper 21 which receives peeled and trimmed potatoes 26 from a potato peeler (not shown). The potatoes 26 are carried upwardly by an elevator 22 to a vibratory feeder 23 for metered distribution to a pair of potato slicers 24. As may be seen in FIGS. 4 and 5, the slicers 24 are positioned so that the whole potatoes 26 will pass through the slicer and issue therefrom as potato slices 27 which are received on an upwardly moving conveyor belt 28 mounted on a fines removal unit 29. A water spray tube 31 is mounted above the conveyor belt 28 to direct cleaning water against the slices 27 moving upwardly on the belt so as to remove fines from the surfaces of the potato slices. The fines are carried by the water into the tub 32 of the fines removal unit 29.

A slice washer and slice spreader unit is mounted to receive slices 27 from the discharge end of conveyor 28. The washer spreader unit 33 includes a water filled pan 34, a carry-out conveyor 36 and multi-bladed paddles 37 mounted in an array on counter-rotating shafts 38. The paddle-equipped shafts 38 extend laterally of the slice take-out conveyor 36 and rotate as indicated by the arrows in FIG. 5 wherein it is shown that the paddles extend beneath the surface of the water and serve to control the spacing of the slices with respect to the take-out conveyor 36 to the end that the slices are arranged in substantially a single layer for subsequent treatment in the process. The purpose is to keep the slices from clumping together by overlap which could prevent full effective cooking through subsequent stages of the process. Washing of the slices removes the starch particles and juices from the slice surfaces as well as any earth or sand debris which is carried through the slicer and fines removal stages.

Figure 5:
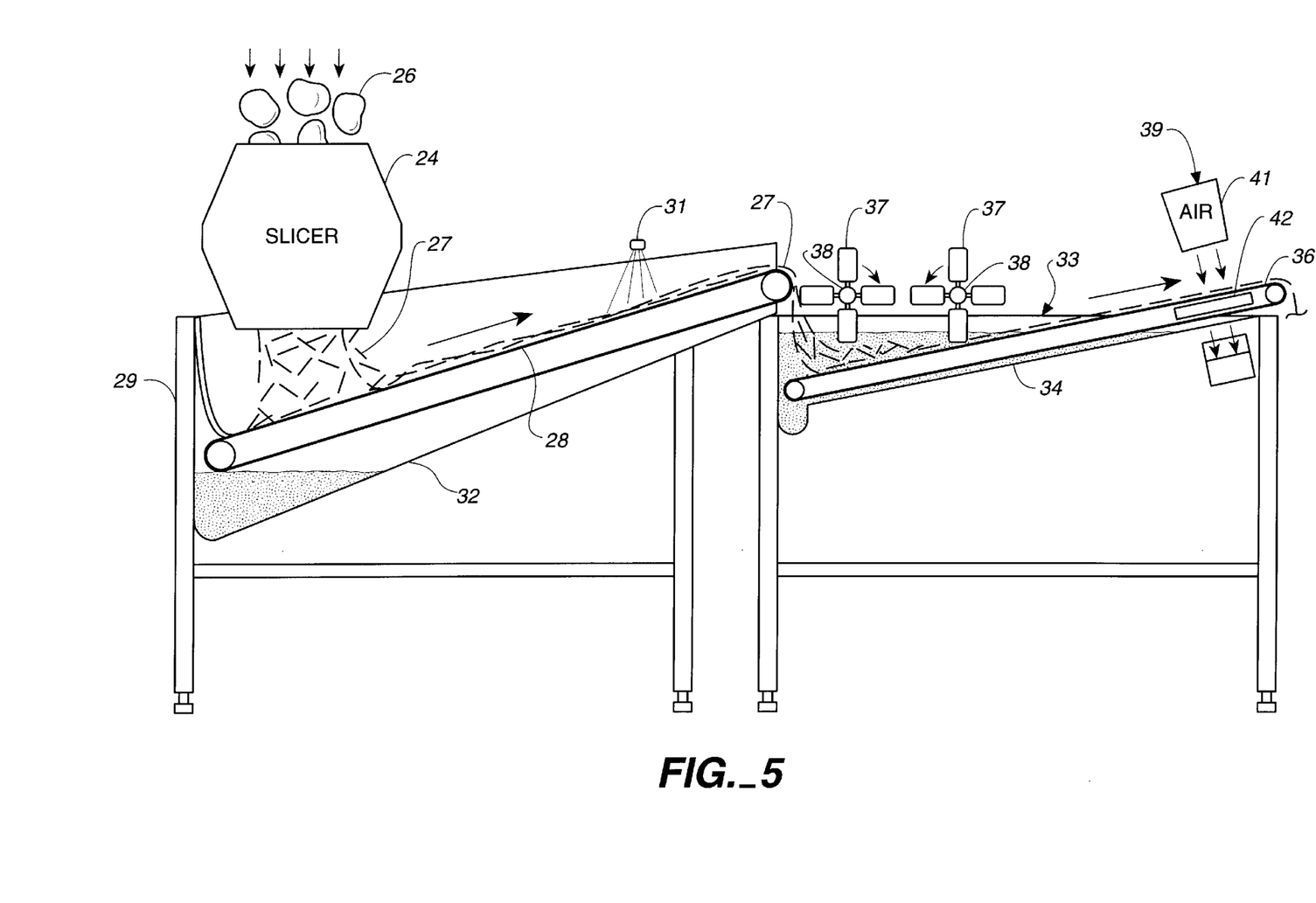
FIG. 5 is an enlarged elevation view taken as indicated by the bracket in FIG. 4.

Upon being removed by the carry-out conveyor 36 from the water contained in the slice washer, the single layer of slices is exposed to a water removal system 39 which serves for the desired removal of surface water from the slices and reduces fuel usage in subsequent stages of the process. The water removal system comprises fast moving curtains of air projected from a plenum 41 positioned above the belt 36 and a suction chamber 42 positioned below the slice carry-out conveyor belt 36. The water contained in the water holding pan 34 may be either at ambient temperature or may be heated to about 130° F. so as to preheat the slices during the washing operation. Slice preheating reduces the heat required in the next process steps, particularly in the blanching step 17.

This invention is directed to a continuous process where the potato slices receive treatment as they are moved through the various process steps and following the potato washing and surface drying, the slices 27 proceed into the cooking stage of the process. More particularly, a convection oven and dryer system act on the slices 27 to deplete the water content from about 80% at the start to about 0.5 to 2% water upon completion of the process. Referring now to FIGS. 3, 4, 6 and 7, the slice heat treatment or cooking is carried out in an infrared and air convection oven 46 coupled with a product dryer 47. It will be understood that the slices are delivered in a continuous fashion from the water removal system 39 into the oven 46 and then on to the dryer 47 with the associated conveyors so arranged that the product will move smoothly from one of the units to the next.

Figure 6:
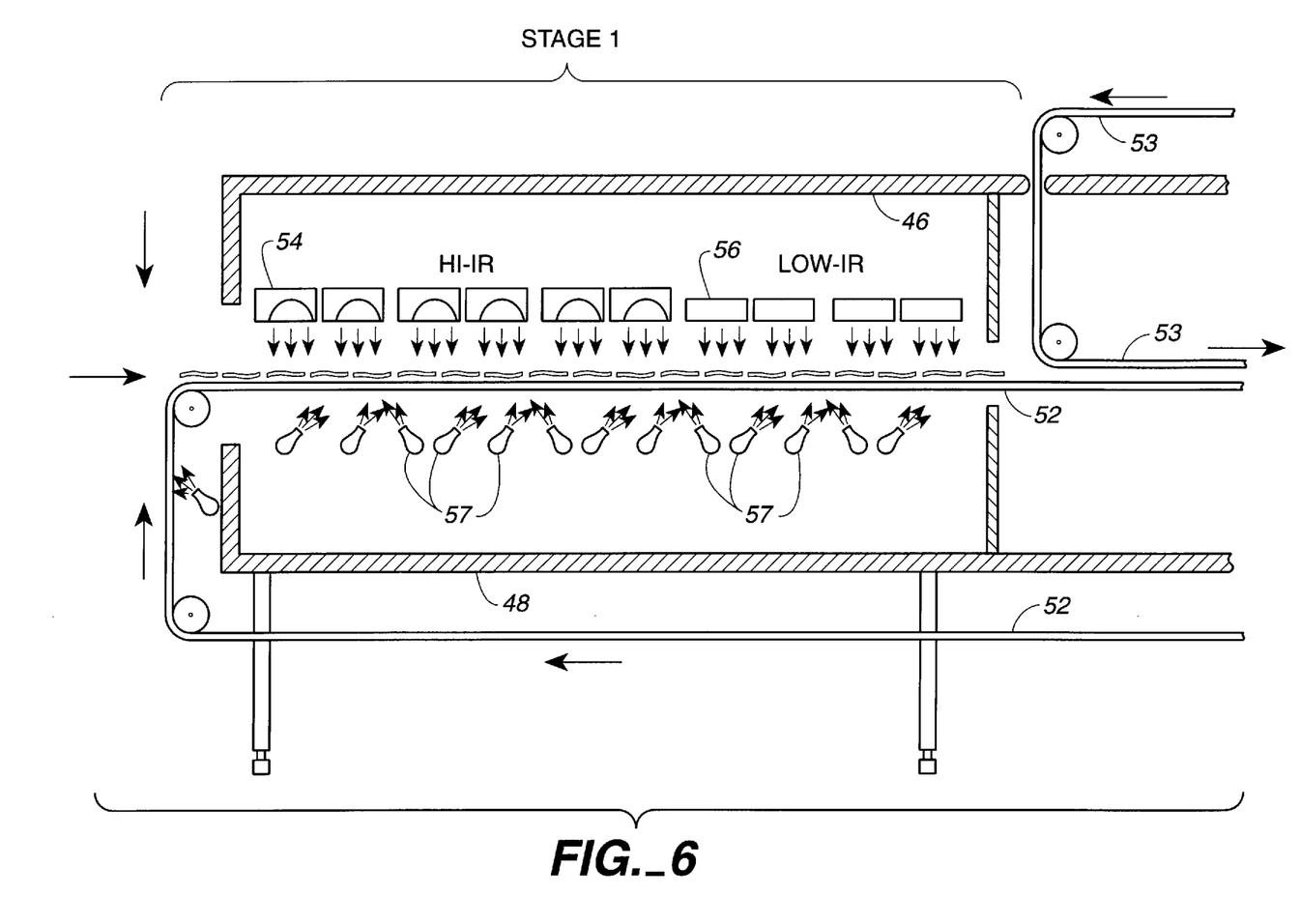
FIG. 6 is a view like FIG. 5 showing the equipment embraced by the bracket in FIG. 4.
Figure 7:
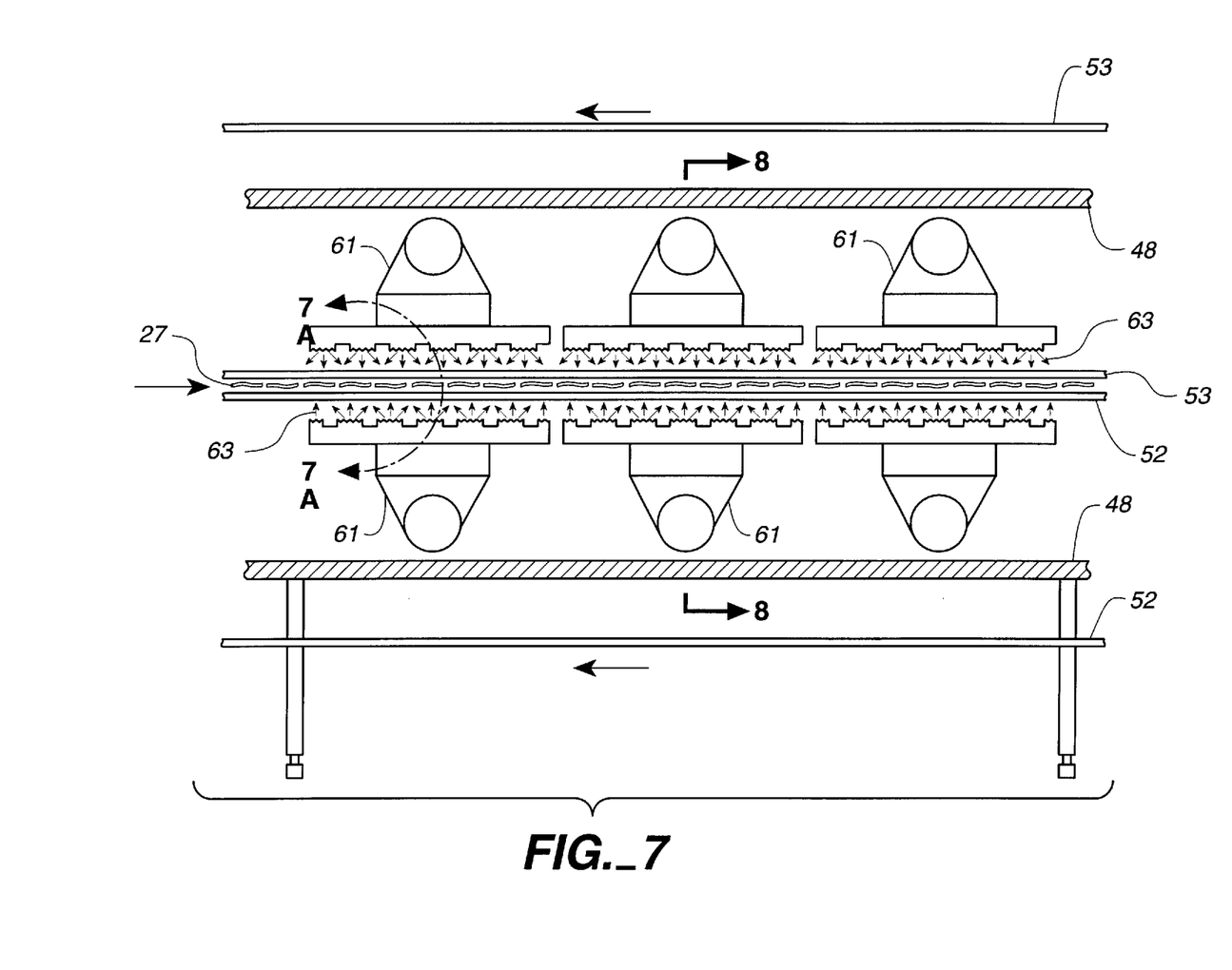
FIG. 7 is a view like FIG. 6 showing the equipment embraced by the bracket 7 in FIG. 4.
Figure 7A:
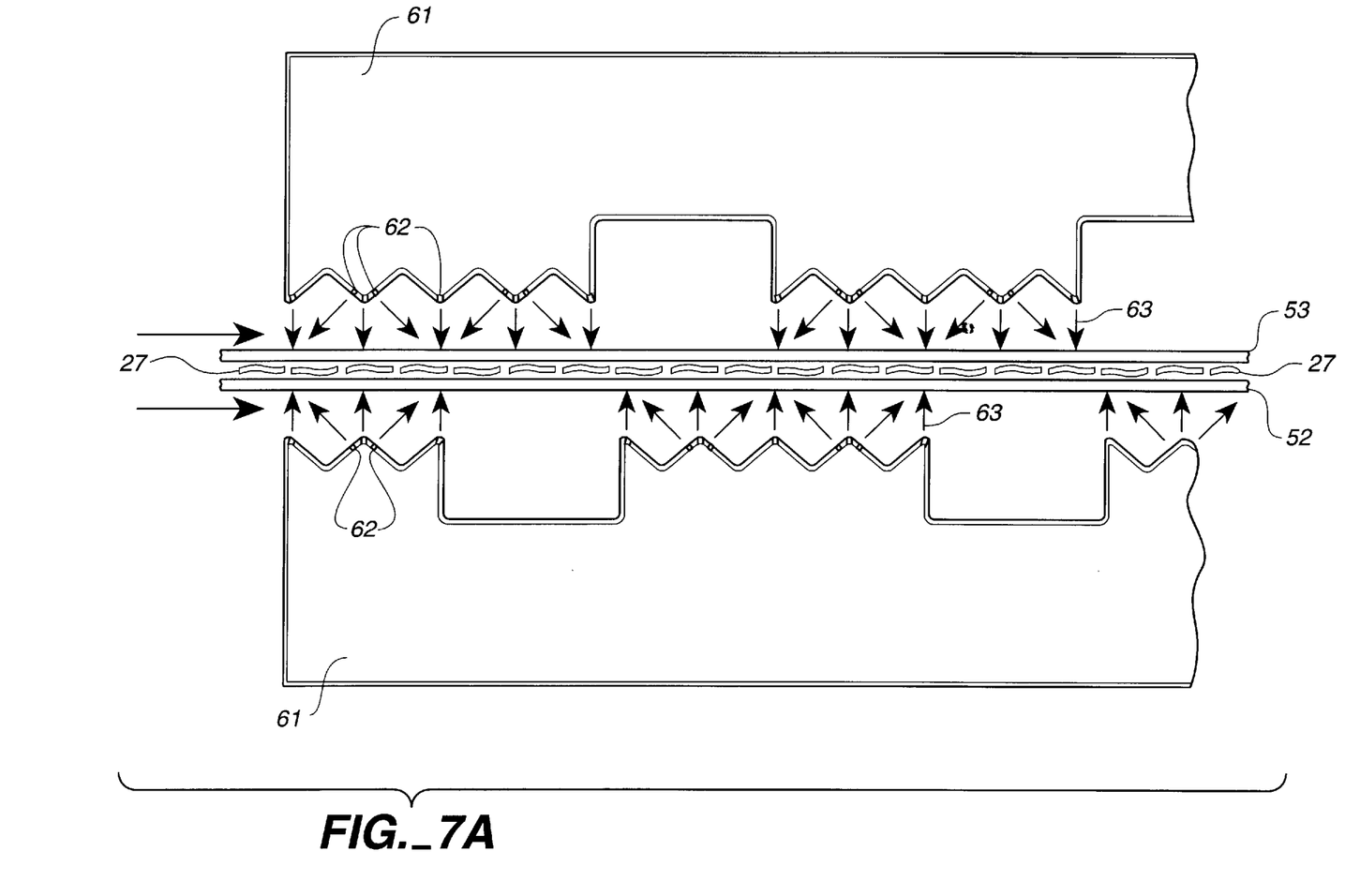
FIG. 7A is a transverse view taken in the direction of the arrow 7-7A in FIG. 7.

The infrared and air convection oven 46 includes an insulated outer housing 48 having an inlet 49 and an outlet 51. A main conveyor belt 52 extends through the inlet 49 and outlet 51 of the oven and is constructed of stainless steel mesh and at the in-feed end is equipped with means for preheating of the oven belt which is required to prevent the potato slices from sticking to the conveyor belt surface. The main conveyor 52 is constructed to have a return run disposed outside of the oven housing 48, as shown in the drawings. For a direct and positive control of the slices so as to maintain them in a mono layer within the oven 46 in the impingement zone, a product hold-down belt 53 is disposed closely space apart from the feed run of the main conveyor belt 52, say for example, less than one inch separation between the two belts. The hold-down belt 53 is preferably of chain-edge, woven wire construction and serves as a containment belt ensuring that the slices are maintained in a single layer for treatment within the air impingement portion of the oven unit 46. The hold-down belt 53 has an overhead or outside on the housing return run as indicated in the drawings.

To supply the high intensity infrared heating for blanching of the potato slices in quenching of enzyme activity, infrared burners 54 and 56 are arranged in the housing 48. Referring to FIG. 6, the infrared burners 54, 56 are disposed closely adjacent to the conveyor belt 53 and comprise a series of high intensity infrared burners, the spacing above the belt being selectively adjustable. The burners are arranged in rows with each row containing several infrared burners incorporating shaped refractory blocks, individual mixers, a flame detector and a gas train as well known in the field. A series of low intensity infrared burners 56 are mounted in a fixed position downstream of the high intensity burners 54 and are arranged in rows with each row containing several burners having a porous ceramic plate covered by an alloy reverberating grid, individual mixers, flame detector and gas train as well known in the field. Open flame extends as well from around the edges of the infra red burners and is in close proximity to the products on the belt.

Mounted beneath the main conveyor belt 52 within the housing 48 are sets of ribbon burners 57, each of which contains an individual mixer, flame detector and gas train as known in the field. Associated combustion air blowers (not shown) are provided for the infrared burners and for the gas ribbon burners 57 as well as ducting to provide positive draft control and exhaust of the hot gases for reuse in other portions of the process. The speed of the slice conveyor belt is selected so that the slices spend a very short time in the zone of infrared heat, generally on the order from 12 to 20 seconds, in which time blanching of the slice occurs and the slice takes on a gelatinous transparent appearance. The temperature in the infrared section is on the order 1400 to 1600° F.

Following the infrared blanching treatment of the slice 27 in the oven 46, an air impingement stage is provided, as indicated as stage 2 in FIGS. 3 and 4. More particularly, air plenums 61 with scatter nozzles 62 of slot-like configuration are mounted above and below the product belt 52. Heated circulating atmosphere is driven by fans (not shown) to drive from the slot-like scatter nozzles 62 the hot dry air against the slices carried between the belts 52, 53. The scatter nozzles 62 are arranged in the plenums so as to direct the air flow as indicated by the arrows 63. If desired, each of the plenums may be supplied with hot air and controlled separately so as to establish separate zones of hot air impingement on the slices wherein each zone includes a heating system (not shown) consisting of a natural gas fired burner and associated blower. The speed of the belts 52, 53 is selected and the length of the air impingement section is designed so that the slices remain subject to this step of the treatment so as to dry down to about 10%–35% moisture. The hold-down belt 53 serves to confine the slices 27 to a defined zone against the fast moving air which may be driven as high as 3000 to 8000 feet per minute at a temperature of about 360 to 400° F. through the multiplicity of scatter nozzles 62.

The slices are transferred out of the infrared air convection oven 46 and are combined into a multi-layer pack of slices for entry into stage 3 of the process which is the final drying stage wherein the slices reach the final desired low moisture content.

Referring now to FIGS. 3 and 4, the dryer 47 includes a housing 66 having an inlet 67 and outlet 68 and a product-carrying conveyor belt 69. The dryer 47 serves as the finishing end section of the process and utilizes a combustion burner and high volume circulating fan (not shown) to circulate dry air vertically down through the multi-layer product bed and upwardly through the same as indicated by the arrow 71 in FIG. 4. By selection of the relative speeds between the product conveyor belt 69 of the dryer and the main conveyor belt 52, the product may be accumulated on the belt 69 at the proper level simply by operating the belt 68 at a much slower speed than the belt 52. Other arrangements for developing a multi-layer pack from single layer potato slices will occur to those skilled in the field.

During this final drying stage of the chip preparation process, the moisture content of the potato slices is reduced to an end amount of about 0.5 to 2% by weight. The exposure time in the dryer is in the range of 5 to 20 minutes and hot air is moved against and through the slice pack in the range of 260° to about 300° F. dry bulb. Air movement is on the order of 100 feet per minute to about 500 feet per minute. This hot air movement prevents condensation within the dryer and contributes to the final crisping of, the chips.

EXAMPLES

Fresh raw Norchip potatoes were first peeled and sliced and then the slices were washed in water at ambient temperature. The slices were removed from the water and dried so as to remove the maximum surface moisture adhering to the slices. A batch of 6 pieces having a batch weight of 39.4 grams was selected and introduced into a high energy infrared source at a temperature of about 1400° F. for 10 seconds. The slices were weighed after removal from the infrared section and found to have a batch weight of 33.1 grams which is about 84% of the original weight. The slices were translucent after treatment in the infrared source and were thereafter placed in a dry air impingement oven and were confined therein by a mesh wire construction to restrain movement of the slices and so as to maintain their single layer arrangement. The air velocity in the dry air impingement was 5800 feet per minute and the temperature was 408° F. The dwell time was 1 minute 15 seconds and the weight upon emergence from this stage was 12.4 grams for the batch which had by then been reduced to 31% of its original weight. Thereafter the slices, which then exhibited blistering and a roughened surface texture, were introduced into a dryer stage where the temperature was at 325° F. and air flow at about 500 feet per minute. The dwell time was 4 minutes and the product weight had then been reduced so that the product slices were about 18.7% of their original weight. The potato slices had a golden appearance, a good bite and surface texture typical of commercial grade deep fat-fried potato slices. There was no oil used anywhere in the process and the consequent slices were a baked, non-oil potato chip product.

As another example, a similar batch of potatoes to that mentioned above received substantially the same preparatory steps before exposure to the high intensity heat source for enzyme quenching. The slices were exposed to the heat high intensity source for about 17 seconds, and then were exposed to the impingement air for 45 seconds at 400 F. Thereafter, the slices were treated in the dryer for 5 minutes 45 seconds at 300 F. The resultant potato chips had excellent surface texture and a No.1 color on the scale of The Potato Chip/Snack Food Association (PCSFA color). Moisture content was on the order of 0.5%.

As a third example, a similar batch of potatoes to that mentioned above received substantially the same preparatory steps before exposure to the high intensity heat source for enzyme quenching. The slices were then exposed to the high intensity source for about 17 seconds, and then were exposed to the impingement air for 45 seconds at 400 F. Thereafter, the slices were treated in the dryer stage for 6 minutes 45 seconds at 290 F. The chips produced had excellent surface blister dispersion and the number 1 PCSFA color.

While the present invention has been described with reference to the preparation of potato chips, other chip products may similarly be prepared by the inventive method described above. Thus, for example, chip products including those made from starting materials such as carrots, bananas, plantains, sweet potatoes, taro root and sheeted products such as tortilla chips, corn chips and the like can similarly be prepared by forming a corn meal dough into appropriately configured pieces or slices for transport through the oven and dryer described above. Those skilled in the art will recognize that various substitutions, omissions, modifications and changes may be made in the method and apparatus of the invention disclosed without departing from the scope or spirit of the invention. Accordingly, it is intended that the foregoing description be considered merely exemplary of the present invention and not a limitation thereof.

What is claimed:

1. Apparatus for continuously cooking a snack food product in the absence of cooking oil, comprising means for preparing slices of the snack food product to be cooked, first conveyor means serving to receive the slices and means serving to dispense the slices in a single layer upon the first conveyor means, an oven housing having a product inlet and a product outlet, second conveyor means extending through said oven housing inlet and outlet and serving to carry the slices therethrough for cooking treatment, said second conveyor means comprising upper and lower conveyor belts of air permeable construction arranged in a vertically spaced apart relationship wherein the lower conveyor belt supports and carries the slices in a substantially non-overlapping, single layer and the upper conveyor belt confines and limits vertical movements of the slices during treatment thereof, high intensity heat transfer means arranged in said oven housing above and below said second conveyor means serving to transmit high intensity heat energy to the slices in the temperature range of about 1200° to 1600° F., first and second arrays of air impingement delivery slots arranged in said oven housing, respectively, above and below said second conveyor means and being disposed in lateral arrays therealong in the direction of slice movement through said oven housing, means serving to supply a first process vapor to issue from said air impingement delivery slots and including means to reheat and recirculate the first process vapor following contact with the slices, means serving to collect the slices into a multi-layer pack, and drying means serving to supply a second process vapor into such multi-layer pack and including means to reheat and recirculate the second process vapor following contact with the slices in the multi-layer pack.

2. The apparatus of claim 1 wherein said high intensity heat transfer means includes infrared burner means which comprise a first burner set and a second burner set sequentially disposed along the length of said second conveyor means, and means for regulating said burner sets so that said first burner set operates at a substantially higher heat transmission rate than said second burner set.

3. The apparatus of claim 1 wherein said drying means comprises a housing, third conveyor means extending through said housing serving to convey the multi layer pack therethrough and including a conveyor belt of air pervious construction, and means serving to drive said second process vapor and circulate such vapor generally normal to said conveyor belt for drying treatment of the multi layer pack.

* * * * *